United States Patent
Wedde et al.

(10) Patent No.: US 10,947,127 B2
(45) Date of Patent: Mar. 16, 2021

(54) PROCESS FOR THE PRODUCTION OF AMMONIUM PERRHENATE

(71) Applicant: Höganäs Germany GmbH, Goslar (DE)

(72) Inventors: Gerhard Wedde, Bad Harzburg (DE); Thomas Müller, Langelsheim (DE)

(73) Assignee: Höganäs Germany GmbH, Goslar (DE)

( * ) Notice: Subject to any disclaimer, the term of this patent is extended or adjusted under 35 U.S.C. 154(b) by 0 days.

(21) Appl. No.: 16/332,758

(22) PCT Filed: Sep. 4, 2017

(86) PCT No.: PCT/EP2017/072112
§ 371 (c)(1),
(2) Date: Mar. 29, 2019

(87) PCT Pub. No.: WO2018/050472
PCT Pub. Date: Mar. 22, 2018

(65) Prior Publication Data
US 2020/0095134 A1   Mar. 26, 2020

(30) Foreign Application Priority Data
Sep. 13, 2016 (DE) .......................... 102016010977.7

(51) Int. Cl.
*C01G 47/00* (2006.01)

(52) U.S. Cl.
CPC .......... *C01G 47/00* (2013.01); *C01P 2006/82* (2013.01)

(58) Field of Classification Search
CPC ...... C01G 47/00; C22B 61/00; C01P 2006/82
USPC ................................ 423/593.1, 50
See application file for complete search history.

(56) References Cited

U.S. PATENT DOCUMENTS

| | | | | |
|---|---|---|---|---|
| 2,876,065 A | * | 3/1959 | Zimmerley | C01G 47/00 423/51 |
| 3,244,475 A | * | 4/1966 | Churchward | C01G 47/00 423/49 |
| 3,376,104 A | * | 4/1968 | Messner | C01G 39/00 423/52 |
| 3,458,277 A | * | 7/1969 | Prater | C01G 39/00 423/21.1 |
| 3,705,230 A | * | 12/1972 | Noy | C22B 59/00 423/50 |
| 3,891,575 A | | 6/1975 | Bräutigam et al. | |
| 4,278,641 A | | 7/1981 | Petrov et al. | |
| 6,039,920 A | * | 3/2000 | Koch | C22C 1/03 420/129 |
| 8,795,509 B2 | | 8/2014 | Olbrich et al. | |
| 2003/0038058 A1 | * | 2/2003 | Acharya | C10G 59/02 208/135 |

FOREIGN PATENT DOCUMENTS

| | | |
|---|---|---|
| DE | 1642924 A1 | 1/1972 |
| DE | 2304001 A1 | 8/1974 |
| DE | 2952358 A1 | 7/1980 |
| DE | 4207137 A1 | 9/1992 |
| DE | 102008026910 A1 | 12/2009 |
| EP | 0568407 A1 | 11/1993 |
| GB | 1103976 A | 2/1968 |

OTHER PUBLICATIONS

Anderson et al, Extractive Metallurgy of rhenium: a review, Minerals and Metallurgical Processing, vol. 30, No. 1, pp. 59-73. (Year: 2013).*
International Search Report and Written Opinion for PCT Application No. PCT/EP2017/072112 dated Nov. 9, 2017, pp. 10. English translation of International Search Report attached.
Anderson, C.D. et al.; Extractive Metallurgy of Rhenium: A Review, Minerals and Metallurgical Processing, vol. 30, No. 1, Feb. 1, 2013, pp. 32.

* cited by examiner

*Primary Examiner* — Steven J Bos

(74) *Attorney, Agent, or Firm* — Lowe Graham Jones PLLC

(57) ABSTRACT

The present invention relates to a process for the production of ammonium perrhenate (APR), which includes the use of Ca(OH)2 and to ammonium perrhenate which can be obtained by the method according to the invention.

9 Claims, No Drawings

PROCESS FOR THE PRODUCTION OF AMMONIUM PERRHENATE

The present application relates to a process for the production of ammonium perrhenate (APR), which comprises the use of Ca(OH)2 as well as to ammonium perrhenate obtained by the method according to the invention.

Ammonium perrhenate (APR) is a white powder characterized by its complete solubility in water. Ammonium perrhenate serves as a raw material in the production of rhenium metal powder and pellets, which are an important additive in superalloys, and is used in the production of rhenium acid. Semi-finished and finished products such as anode plates for medical applications also use rhenium metal powder.

Ammonium perrhenate is used directly in the production of catalysts, in particular in the production of platinum-rhenium catalysts used in the refinery of crude oil.

In particular the use of ammonium perrhenate in the production of catalysts places highest requirements on purity and complete solubility of ammonium perrhenate. A complete solubility results in a particularly uniform catalyst since the rhenium can be fully exploited. The high purity of the ammonium perrhenate guarantees that the catalyst is free of impurities which could cause an impairment of the performance in later use.

Numerous processes for the production of ammonium perrhenate are known in the prior art. A rhenium containing solution is usually dissolved under alkaline conditions with sodium hydroxide solution (NaOH) and hydrogen peroxide (H2O2), and the filtrate is purified by means of an ion exchanger. In conventional production processes, the production is usually carried out by washing the ion exchanger with hydrochloric acid which is evaporated in a further step to obtain the actual product.

DE 42 07 137 describes a process for the selective separation of rhenium from acidic molybdenum-containing solutions, in which the rhenium is fixed on an absorbent (resin or solvent) based on secondary or tertiary amines. The absorbent loaded with pure rhenium is eluted with a basic solution to obtain a final solution of pure perrhenate, for example ammonium perrhenate.

However, the conventional processes for the production of ammonium perrhenate described in the prior art have the disadvantage that they are time and cost intensive, and this is in particular due to the loading and unloading of the ion exchanger and the evaporation of the hydrochloric acid. Furthermore, the process requires an elaborate treatment of waste water before it can be discharged into the wastewater disposal.

U.S. Pat. No. 3,376,104 discloses a process to obtain rhenium and molybdenum oxide from the corresponding sulfide ores. In this regard, the ore is mixed with Ca(OH)2 or CaCO3 and heated to 566° C. to 732° C. to obtain calcium perrhenate and calcium molybdate and the water solubility of the calcium perrhenate is exploited for its separation.

U.S. Pat. No. 3,244,475 describes a process for separating rhenium and molybdenum from an aqueous solution by the addition of kerosene containing an ammonium compound of the formula R3(CH3)NCl, with R being a saturated linear C8-C10 hydrocarbon residue. The rhenium thus obtained can be isolated as ammonium perrhenate by washing the organic phase with perchloric acid and a soluble perchlorate.

However, these processes are not suitable to surmount the aforementioned disadvantages. Therefore, it is the object of the present invention to provide a process for the production of ammonium perrhenate, which not only provides a high-purity product, but also reduces the throughput times in production and thus avoids an unnecessary lock-up of capital.

It was surprisingly found that the treatment of an aqueous solution comprising rhenium-containing compounds with Ca(OH)2 allows that an ion exchanger can be left out, without the purity or water solubility of the product being affected.

Therefore the subject matter of the present invention is a process for the production of ammonium perrhenate, comprising the following steps:
  providing an aqueous suspension comprising rhenium-containing compounds;
  adding Ca(OH)2 to the suspension from step a), the pH value being greater than 7;
  adding an oxidizing agent to the aqueous suspension from step b), the temperature of the suspension not exceeding 50° C.;
  heating the suspension from step c) to at least 95° C. and subsequent filtering, the suspension being cooled to 60° C. or less prior to filtration;
  adding an ammonium carbonate to the filtrate from step d) to obtain an aqueous suspension containing ammonium perrhenate;
  filtering the suspension from step e);
  reducing the amount of liquid of the filtrate from step f) to obtain solid ammonium perrhenate.

It was surprisingly found that the process according to the invention can dispense with an ion exchanger, and therefore the costly and time-consuming step of loading and unloading the ion exchanger as well as complex waste water treatment is omitted, which not only saves costs, but also significantly reduces the throughput time. The throughput time of the inventive process is in the range of 48 to 72 hours. In contrast thereto, the use of an ion exchanger requires a minimum amount of material, which significantly increases throughput times. In particular, the use of Ca(OH)2 instead of conventional NaOH allows an efficient and simple separation of rhenium, without use of an ion exchanger being required.

Due to the limited availability of rhenium and the high demand, the recovery of rhenium is becoming increasingly important. Rhenium sources include metal waste, semi-finished products and superalloys. Therefore, an embodiment of the process according to the invention is preferred, in which the rhenium-containing compounds in step a) are obtained from rhenium-containing waste. Rhenium can be present in the form of its sulphides or oxides. Particularly preferable the rhenium-containing waste is such waste that is obtained from rhenium metal waste such as semi-finished products, superalloys and catalysts. Preferably, the rhenium-containing compounds are selected from the group consisting of ReS2, Re2S7, ReO2 and mixtures thereof.

Preferably, the suspension in step (a) of the process according to the invention is obtained by treating rhenium-containing compounds in water in the presence of acid. The acid used is preferably an inorganic acid such as hydrochloric acid or sulphuric acid, in particular hydrochloric acid. For example, metal waste can be ground to a powder and mixed with hydrochloric acid.

In particular, when processing alloy waste, the separation of rhenium from the other constituents such as nickel, chromium or cobalt can be improved by using hydrochloric acid with a concentration above 10% at temperatures above 70° C. Very good results can be achieved with 20% hydrochloric acid heated to about 90° C. Alternative methods known to the skilled person can also be used for the production of the aqueous suspension containing rhenium-containing compounds.

In a particularly preferred embodiment, the suspension in step a) of the inventive process also contains further compounds in addition to rhenium-containing compounds. These other compounds are in particular metal compounds, the metal being selected from the group consisting of molybdenum, tungsten, tantalum, cobalt, copper, chromium and nickel and mixtures thereof.

In step b) of the process according to the invention, Ca(OH)2 is added to the suspension from step a), the pH value being greater than 7. In particular the use of Ca(OH)2 in this step of the inventive process allows the efficient separation of rhenium from the starting solution, and therefore purification by means of an ion exchanger required in conventional processes can be dispensed with.

The suspension obtained in step (b) of the procedure according to the invention is mixed with an oxidizing agent and the temperature of the suspension is not supposed to exceed 50° C. (step (c)). Preferably, the temperature is in the range of 30° C. to 50° C. A lower temperature results in insufficient oxidation of the rhenium-containing compound. If a too high temperature is selected, this leads to a decomposition of the oxidizing agent without the desired oxidation taking place. The oxidizing agent used is preferably selected from hydrogen peroxide, chlorates and perchlorates. In particular, the oxidizing agent is hydrogen peroxide.

After oxidation, the suspension from step c) is heated to a temperature of at least 95° C., preferably 95° C. to 110° C. Preferably, the suspension is kept at this temperature for a period of 5 to 20 hours, particularly preferably 10 to 15 hours. In this way a complete dissolution of the rhenium can be achieved. Afterwards, the suspension is cooled to a temperature below 60° C., preferably a temperature in the range of 40° C. to 60° C., in particular 45° C. to 55° C. After cooling, the suspension is filtered. It has been surprisingly found that a temperature outside the specified range leads to unwanted product loss during filtration.

After filtration in step d) of the process according to the invention, the filtrate obtained is mixed with an ammonium carbonate so that an aqueous suspension containing ammonium perrhenate is obtained. The ammonium carbonate is preferably selected from ammonium hydrogen carbonate (NH4HCO3) and ammonium carbonate ((NH4)2CO3). It was surprisingly found that the use of an ammonium carbonate provides ammonium perrhenate in high yields and with a high degree of purity.

In a preferred embodiment of the process according to the invention, the suspension can be heated in step e) to a temperature in the range of 50° C. to 70° C., preferably 60° C. to 70° C. Surprisingly, it has been shown that the yield of ammonium perrhenate can be increased by the additional heating.

In a further step, i.e. step f), of the process according to the invention, the suspension from step e) is filtered. It was surprisingly found that yield losses can be avoided if the suspension does not exceed a temperature of 60° C. during filtration. Therefore, the temperature of the suspension during filtration is preferably in the range of 40° C. to 60° C., in particular 45° C. to 55° C. The filtration can be carried out according to conventional methods known to the skilled person. Preferably, the filtration is performed in a filter press.

In step g) of the process according to the invention, the amount of liquid of the filtrate from step f) is reduced to obtain the ammonium perrhenate in solid form. The reduction of the liquid can be effected according to methods known to the skilled person, for example under reduced pressure.

The ammonium perrhenate thus obtained can be subjected to further purification steps such as recrystallization.

As already stated, the ammonium perrhenate serves as a precursor in the production of rhenium metal powder or pellets as well as rhenium acid. In a preferred embodiment, the ammonium perrhenate obtained is therefore further converted to rhenium.

The process according to the invention provides ammonium perrhenate with a purity degree that is significantly higher than that achieved by conventional production processes.

Therefore, a further subject matter of the present invention relates to ammonium perrhenate obtained in accordance with the process according to the invention.

The rhenium content that can be theoretically obtained in ammonium perrhenate is 69.41%. It was surprisingly found that ammonium perrhenate according to the present invention has a rhenium content in the range of 62 to 67% based on the total weight of the ammonium perrhenate, which can be increased by further purification steps to the theoretically maximum possible value of 69.4%. In contrast, ammonium perrhenate that was produced, for example, using an ion exchanger has a rhenium content in the range of 50 to 60%. Therefore, an embodiment is preferred, in which the ammonium perrhenate according to the invention has a rhenium content of at least 62%, preferably at least 67%, based on the total weight of the ammonium perrhenate.

Another criterion for the purity and quality of ammonium perrhenate is the water content thereof. While an ammonium perrhenate produced by conventional processes has a water content of 15 to 25%, it was surprisingly found that the water content of the ammonium perrhenate obtained by the process according to the invention is significantly lower. Thus, the ammonium perrhenate according to invention preferably has a water content of less than 5%, based on the total weight of the ammonium perrhenate, preferably a water content in the range of 0.1 to 5%, preferably 0.1 to 4.5% and, particularly preferred, 0.1 to 3%, based in each case on the total weight of the ammonium perrhenate.

Ammonium perrhenate is widely used in industry and technology. Therefore a further subject matter of the present invention is the use of an ammonium perrhenate according to the invention for the production of catalysts, the production of rhenium metal, the production of superalloys as well as the production of rhenium acid.

EXAMPLES

Example 1

Ammonium perrhenate was produced from a rhenium-containing compound in accordance with the inventive process of the present invention.

400 kg rhenium sulphide is suspended in 4 m3 of water, and then 400 kg Ca(OH)2 is added so that a pH value above 7 is obtained. Subsequently, 400 liters of hydrogen peroxide (30% aqueous solution) are added at a temperature of about 40° C. After oxidation, the suspension is heated to 95° C. and kept at this temperature for 12 hours.

The suspension is then cooled to 60° C. and supplied by a pump to a filter press and is filtered.

The filtrate is kept at 60° C. and ammonium hydrogen carbonate is added to form ammonium perrhenate. The suspension thus obtained is then filtered at 50° C. in a filter press. The filtrate is then dried under reduced atmospheric pressure.

The analysis of the ammonium perrhenate obtained revealed a rhenium content of 67.09% by weight.

Comparative Test

According to the prior art, a rhenium sulfide concentrate (Re2S7) was dissolved under alkaline conditions with NaOH and H2O2 and was then obtained by an ion exchanger as well as subsequent recovery of the rhenium by evaporation.

The rhenium content of the process known according to the prior art resulted in a value of 58.55% by weight.

The process according to the invention also leads to products with a low water content.

The invention claimed is:

1. Process for the production of ammonium perrhenate, comprising the following steps:
   a) providing an aqueous suspension comprising rhenium-containing compounds;
   b) adding $Ca(OH)_2$ to the suspension from step a), the pH value being greater than 7;
   c) adding an oxidizing agent to the aqueous suspension from step b), the temperature of the suspension not exceeding 50° C.;
   d) heating the suspension from step c) to at least 95° C. and subsequent filtration, the suspension being cooled to 60° C. or less prior to filtration;
   e) adding an ammonium carbonate to the filtrate from step d) to obtain an aqueous suspension containing ammonium perrhenate;
   f) filtering the suspension from step e);
   g) reducing the amount of liquid of the filtrate from step f) to obtain solid ammonium perrhenate.

2. Process according to claim 1, characterized in that the rhenium-containing compounds are obtained from rhenium-containing by-products.

3. Process according to claim 1, characterized in that the aqueous suspension in step a) is produced by treating the rhenium-containing compounds in water in the presence of acid.

4. Process according to claim 1, characterized in that the rhenium-containing compounds are selected from the group consisting of $ReS_2$, $Re_2S_7$, and $ReO_2$.

5. Process according to claim 1, characterized in that the oxidizing agent in step c) is selected from the group consisting of hydrogen peroxide, chlorates, perchlorates, and mixtures thereof.

6. Process according to claim 1, characterized in that the ammonium carbonate is selected from ammonium carbonate or ammonium hydrogen carbonate.

7. Process according to claim 1, characterized in that the suspension from step e) is heated to a temperature in the range of 60° C. to 70° C.

8. Process according to claim 1, characterized in that the ammonium perrhenate is subjected to further purification steps.

9. Process according to claim 1, characterized in that the ammonium perrhenate is further converted to rhenium metal.

* * * * *